US011659903B2

(12) United States Patent
Zebley

(10) Patent No.: US 11,659,903 B2
(45) Date of Patent: *May 30, 2023

(54) BAND FOR PERFORMING AN INTERACTIVE ACTIVITY

(71) Applicant: David Gareth Zebley, South Lyon, MI (US)

(72) Inventor: David Gareth Zebley, South Lyon, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/847,529

(22) Filed: Jun. 23, 2022

(65) Prior Publication Data
US 2022/0312909 A1 Oct. 6, 2022

Related U.S. Application Data

(63) Continuation of application No. 17/332,329, filed on May 27, 2021, which is a continuation of application No. 16/010,113, filed on Jun. 15, 2018, now Pat. No. 11,039,669, which is a continuation of application No. 14/317,911, filed on Jun. 27, 2014, now Pat. No. 9,999,280.

(51) Int. Cl.
 *A44C 23/00* (2006.01)
 *H04W 4/21* (2018.01)
 *H04W 4/80* (2018.01)

(52) U.S. Cl.
 CPC ............... *A44C 23/00* (2013.01); *H04W 4/21* (2018.02); *H04W 4/80* (2018.02)

(58) Field of Classification Search
 CPC ........... A44C 23/00; H04W 4/21; H04W 4/80
 See application file for complete search history.

(56) References Cited

U.S. PATENT DOCUMENTS

| 4,365,246 | A  | 12/1982 | Dewolf et al.    |
| 6,323,846 | B1 | 11/2001 | Westerman et al. |
| 6,882,333 | B2 | 4/2005  | Komura et al.    |
| 7,050,835 | B2 | 5/2006  | Hack et al.      |
| 7,618,260 | B2 | 11/2009 | Daniel et al.    |

(Continued)

FOREIGN PATENT DOCUMENTS

| WO | 2001048720 A1 | 7/2001  |
| WO | 2004114107 A1 | 12/2004 |
| WO | 2007012899 A1 | 2/2007  |

OTHER PUBLICATIONS

Unknown, "Bluetooth Bracelet with Vibration Function and Digital Time Display," Niceeshop, 2011, 2 pages, found at http://www.amazon.com/Bluetooth-Bracelet-Vibration-Function-Digital/dp/B00512Z8H2.

(Continued)

*Primary Examiner* — Eddy Saint-Vil
(74) *Attorney, Agent, or Firm* — Darrow Mustafa PC

(57) ABSTRACT

System, methods, and other embodiments described herein relate to performing an interactive activity using a band. In one embodiment, a method includes touching a subset of virtual inputs, on a touch sensor associated with a first band, relating to an interactive activity with a second band. The method may also include communicating, by the first band, first data to a first mobile device, the first data including information that identifies completion of the interactive activity and indicates a time that the subset are touched. The method may also include the first band triggering the first mobile device to communicate second data to a second mobile device to replicate the interactive activity.

20 Claims, 3 Drawing Sheets

(56) References Cited

U.S. PATENT DOCUMENTS

| | | |
|---|---|---|
| 7,705,830 B2 | 4/2010 | Westerman et al. |
| 8,400,384 B2 | 3/2013 | Gass et al. |
| 8,466,873 B2 | 6/2013 | Vertegaal et al. |
| 8,562,489 B2 | 10/2013 | Burton et al. |
| 8,630,633 B1 | 1/2014 | Tedesco et al. |
| 8,641,306 B2 | 2/2014 | Schaffer |
| 9,288,836 B1 | 3/2016 | Clement et al. |
| 2003/0086521 A1 | 5/2003 | Rana |
| 2003/0148742 A1 | 8/2003 | Kim |
| 2006/0096392 A1 | 5/2006 | Inkster et al. |
| 2007/0085838 A1 | 4/2007 | Ricks et al. |
| 2007/0139391 A1 | 6/2007 | Bischoff |
| 2007/0279852 A1 | 12/2007 | Daniel et al. |
| 2007/0292827 A1 | 12/2007 | Forbath |
| 2009/0087825 A1 | 4/2009 | Govindswamy et al. |
| 2009/0293540 A1 | 12/2009 | Clark |
| 2010/0085279 A1 | 4/2010 | Repko |
| 2011/0037792 A1 | 2/2011 | Wakabayashi et al. |
| 2012/0184367 A1 | 7/2012 | Parrott et al. |
| 2013/0146659 A1 | 6/2013 | Zhou et al. |
| 2013/0154826 A1 | 6/2013 | Ratajczyk |
| 2013/0197680 A1 | 8/2013 | Cobbett et al. |
| 2013/0262298 A1 | 10/2013 | Morley |
| 2014/0239065 A1 | 8/2014 | Zhou et al. |
| 2014/0266731 A1 | 9/2014 | Malhotra |
| 2015/0145674 A1 | 5/2015 | Rydfors et al. |
| 2015/0182128 A1 | 7/2015 | Magi |
| 2015/0185762 A1 | 7/2015 | Magi |
| 2015/0185884 A1 | 7/2015 | Magi |
| 2015/0186705 A1 | 7/2015 | Magi |
| 2015/0189403 A1 | 7/2015 | Magi |
| 2015/0189958 A1 | 7/2015 | Sudak |
| 2015/0355800 A1 | 12/2015 | Cronin |
| 2016/0134737 A1 | 5/2016 | Pulletikurty |
| 2016/0277649 A1 | 9/2016 | Katz et al. |
| 2017/0006414 A1 | 1/2017 | Tomassini |
| 2017/0012925 A1 | 1/2017 | Tekin et al. |

OTHER PUBLICATIONS

Krizia Irish, "A Prayer Reminder that Works!" Meaning to pause, LLC, Jan. 10, 2011, 2 pages, found at http://www.catholic.org/prwire/headline.php?ID=9597.

Mich Cafe, "Digital Prayer Beads: New Technological Marvel," MidEastPosts, Nov. 11, 2012, 3 pages, found at http://mideastposts.com/middle-east-society/digital-prayer-beads-todays-technological-marvel/.

Unknown, "Pebble: E-Papper Watch for iPhone and Android," Kickstarter Campaign run from Apr. 11, 2012 to May 18, 2012, 12 pages, found at https://www.kickstarter.com/projects/597507018/pebble-e-paper-watch-for-iphone-and-android/description.

"Digital Tasbeeh (Prayer Beads)—Android Apps on Google Play," Jan. 11, 2012, found at https://play.google.com/store/apps/details?id=com.unreal.tasbeeh&hl=en_GB.

"Digital rosary beads on new iPhone app," Mar. 8, 2010, found at http://www.telegraph.co.uk/technology/apple/7399765/Digital-rosary-beads-on-new-iPhone-app.html.

Fahhem, Prayer 0.3.2 (Pebble application), apps.getpebble.com, Mar. 14, 2014, found at https://apps.getpebble.com/en_US/application/52eadb5eeaff132c5100001f.

Non-Final Office Action dated Nov. 6, 2017, for U.S. Appl. No. 14/317,911.

Final Office Action dated Apr. 20, 2017, for U.S. Appl. No. 14/317,911.

Non-Final Office Action dated Jun. 30, 2016, for U.S. Appl. No. 14/317,911.

Non-Final Office Action dated Sep. 3, 2020, for U.S. Appl. No. 16/010,113.

BAND FOR PERFORMING AN INTERACTIVE ACTIVITY

CROSS-REFERENCE TO RELATED APPLICATIONS

This application is a continuation of U.S. patent application Ser. No. 17/332,329, filed May 27, 2021, which is a continuation of U.S. patent application Ser. No. 16/010,113, filed Jun. 15, 2018 and issued as U.S. Pat. No. 11,039,669, which is a continuation of U.S. patent application Ser. No. 14/317,911, filed Jun. 27, 2014 and issued as U.S. Pat. No. 9,999,280, which are incorporated by reference as if fully set forth.

FIELD OF INVENTION

This application is directed to electronic communication devices and devices to assist in prayer, meditation, or the like.

BACKGROUND

Social media continues to grow exponentially. Individuals receive increasing volume of news alerts, advertising, emails, texts, tweets, Facebook notifications, Instagram notifications, etc. to a point where there may be less personal time for meditation, prayer, affirmation, self-reflection, thoughtful introspection, or the like.

Consumers continue to adapt to the capabilities and conveniences afforded by mobile communication devices. Consumers also show a willingness to wear bracelets as a sign of support for a specific cause or as a psychological trigger for a particular purpose.

There is also growth in demand for more traditional prayer/meditation beads which is linked to a positive trend in individuals' desire to "disconnect" from their digital life and spend more time meditating and praying. Beads have been used for centuries as a way to keep track of prayers, meditations, and affirmations. An example is the rosary beads used by some Catholics. By physically touching each bead, the individual's focus is anchored to their task and thoughts, and they are less easily distracted by their surroundings. This focus results in a longer and higher quality of time spent in prayer or meditation that in turn increases the psychological, physical, and spiritual benefits derived from such activity.

SUMMARY

A bracelet/band and a system to enhance an experience of prayer or meditation are described. Also described is a method of enhancing an experience of prayer or meditation. The bracelet/band may be configured to be worn on a wrist of a user and configured to assist and enhance an act of praying or meditating. The bracelet/band may include a plurality of active buttons to facilitate praying or meditating. The bracelet/band may also include wireless communication circuitry configured to wirelessly communicate two-way signals with a second communication device.

DETAILED DESCRIPTION

In the description forthcoming, the apparatuses and processes are given within the context of prayer or meditation. However, the configurations and features may relate to any bracelet/band in communication with an electronic device or computer. Moreover, individuals engaging in the acts of meditation and prayer may benefit from a device that retains the heritage and benefits of using prayer/meditation beads while harnessing the convenience, capabilities, and robustness of today's wireless communication technology.

Also in the description forthcoming is a prayer or meditation bracelet/band configured to provide religious social networking, prayer, meditation, or the like via mobile computer devices and the Internet. For instance, a mobile application or application programming interface (API) may be provided to provide such functions on mobile computer devices. Such a configuration may be used to setup, coordinate, or facilitate prayer or meditation groups. Such a bracelet/band may also be designed to be fashionable for women or men to wear. Such a bracelet/band may also setup, coordinate, or facilitate dating or any relationship.

Figure 1A:
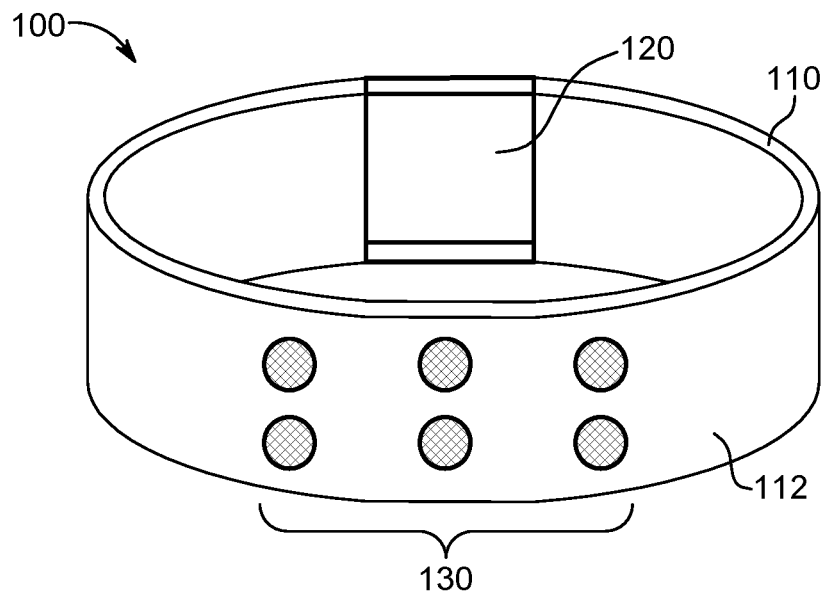
FIG. 1A shows an embodiment of a bracelet/band.

FIG. 1A shows one embodiment of a wearable computer bracelet/band 100 configured to be worn on the wrist of a user and configured to assist and enhance an act of praying or meditating. The embodiment of a bracelet/band 100 in FIG. 1A is one example of such a bracelet/band and is not to be considered limiting. Bracelet/band 100 may be configured as any one or more of a portable communication device, general computer, wireless subscriber unit, mobile device, user equipment (UE), mobile station, smartphone, pager, mobile computer, cellular phone, cellular telephone, telephone, personal digital assistant (PDA), computing device, sensor, machine, versatile device, appliance, personal computer (PC), digital music player, peripheral, add-on, an attachment, media player, video game device, wearable computer, Internet of Things (IoT) device, or any other electronic device for mobile or fixed mobile applications.

In addition, the bracelet/band 100 may be configured with one or more display devices that can be configured as a liquid crystal display (LCD), light emitting diode (LED), field emission display (FED), surface-conduction electron-emitter display (SED), organic light emitting diode (OLED), flexible OLED, a high definition (HD) display, an In-Plane Switching (IPS) based display, or any other display device. Any one of these displays may be configured, manufactured, produced, or assembled based on the descriptions provided in U.S. Patent Publication Nos. 2006-0096392, 2007-0139391, 2007-0085838, or 2011-0037792 or U.S. Pat. Nos. 6,882,333, 7,050,835, 8,400,384, or 8,466,873, or WO Publication No. 2007-012899 that are all herein incorporated by reference as if fully set forth.

In the case of a flexible or bendable display device, the one or more electronic display devices may be configured and assembled using organic light emitting diodes (OLED), liquid crystal displays using flexible substrate technology, flexible transistors, field emission displays (FED) using flexible substrate technology, or the like. Any one of the provided display devices herein may be self-lighting or use backlighting sources (e.g. LED, Cold Cathode Fluorescent Lamp (CCFL), etc.). One or more display devices may be wholly or partially transparent, using one of the display technologies mentioned herewith.

One or more display devices on bracelet/band 100 can be configured as a touch, multi-input touch, multiple input touch, multiple touch, or multi-touch screen display using resistive, capacitive, surface-acoustic wave (SAW) capacitive, infrared, strain gauge, optical imaging, dispersive signal technology, acoustic pulse recognition, frustrated total internal reflection, or magneto-strictive technology, as understood by one of ordinary skill in the art. One or more display devices on bracelet/band 100 can also be configured as a three dimensional (3D), electronic paper (e-paper), or electronic ink (e-ink) display device.

In addition, bracelet/band 100 may be configured with a universal serial bus (USB) connection, a USB device, or the like. Bracelet/band 100 may also be configured with a global navigation satellite system (GNSS) device or Global Positioning System (GPS) device.

Bracelet/band 100 may have one or more motion, proximity, light, optical, chemical, biological, medical, environmental, barometric, atmospheric pressure, moisture, acoustic, audible, heat, temperature, metal detector, radio frequency identification (RFID), biometric, face recognition, facial recognition, image, infrared, camera, photo, or voice recognition sensor(s). One or more sensors may also be an accelerometer, an electronic compass (e-compass), a gyroscope, a 3D gyroscope, a 3D accelerometer, a 4D gyroscope, a 4D accelerometer, or the like. One or more sensors may operate with respective software engines/components in software/OS on bracelet/band 100 or mobile computer 220a to interpret/discern/process detected measurements, signals, fields, stimuli, inputs, or the like.

Bracelet/band 100 may also have touch detectors for detecting any touch inputs, multi-input touch inputs, multiple input touch inputs, multiple touch inputs, or multi-touch inputs for one or more display devices on bracelet/band 100. Touch detectors may be configured with one or more display devices as provided in U.S. Pat. Nos. 6,323,846 or 7,705,830 that are both herein incorporated by reference as if fully set forth. One or more display devices may be configured with pressure sensors for detecting presses on the display devices.

Bracelet/band 100 may be substantially circular as a ring 110. A plurality of buttons 130 may be arranged on ring 110. Ring 110 may be made of metal, plastic, composites, rubber, carbon fiber, or any material wearable on a wrist. Buttons 130 may be active buttons, meaning that pushing or touching such a button may result in an action of the bracelet/band 100, such as turning on a light, producing a sound, or producing a tactile sensation. Tactile sensations may be a vibration, gyration, friction, buzz, or the like. Buttons 130 may be physical buttons, extending substantially above, extending substantially below, or being substantially flush with a background surface of ring 110.

Buttons 130 may be virtual or soft buttons on a touch-sensitive display screen. Examples of a touch-sensitive display screen may be a touchscreen, a multi-touch screen, or the like. The number of buttons 130, positions of the buttons relative to one another, and actions resulting from pressing or touching a button may configured to facilitate praying or meditating or to remind a user to engage in a prayerful or meditative activity at a specific time. As an example, not to be considered limiting, bracelet/band 100 is shown having six buttons, arranged in two rows of three buttons each. Each button 130 may be associated with a light emitter, such as a light-emitting diode (LED), a small filament light bulb, an electroluminescent chip, or any other light source. Alternatively, light emitters may be located elsewhere on bracelet/band 100.

As an example of facilitating a prayer or meditation, the user may press a button 130 as the user completes a section of a prayer or meditation. Pressing a button may then turn on a corresponding light emitter. The light may serve as a reminder to the user that the section has been completed. In this way, the bracelet/band 100 helps the user keep a count of various parts of a prayer or meditation, similar to the function of beads on a traditional prayer device such as a rosary.

Bracelet/band 100 may have a housing (not shown) for at least some buttons, processor(s), display(s), driving circuitry for the light emitters, a vibration mechanism, a battery, or any other electronic components. Bracelet/band 100 may include a clasp/fastener 120, configured to allow easy attachment to and removal from a user's wrist. Clasp/fastener 120 may also act as housing for at least some buttons, processor(s), display(s), driving circuitry for the light emitters, a vibration mechanism, a battery, or for any other electronic components. However, any one of such driving circuitry, vibration mechanism, battery, and other electronic components may be situated anywhere on bracelet/band 100.

Bracelet/band 100 may be configured to be programmable and may be configured for wireless communication, in order to provide a further enhanced prayer or meditation experience. To this end, bracelet/band 100 may contain one or more of: a programmable electronic processor, a programmable memory, a read-only memory, a clock or counter, wireless communication circuitry, and an antenna for wireless communication. The processor may be programmed to control and interact with at least one of driving circuitry for the light emitters, a vibration mechanism, a programmable memory, a read-only memory, a clock, a counter, or wireless communication circuitry.

As an example of a further enhanced prayer or meditation experience, the buttons 130 and associated electronics may be configured to act in a pre-determined sequence that reminds the user regarding various parts of a prayer or meditation. For example, the user may define how long a particular button or set of buttons must be dwelled upon (e.g. touched) at a given time to register as a completed section of a prayer or meditation. This time may then be stored in a memory for each button, or included in a program executed by the processor. When this dwell time for a particular button has elapsed, the bracelet/band 100 may alert the user by, for example, vibrating, by emitting a sound, or by turning on or off the light emitter corresponding to the particular button. As another example, bracelet/band 100 may be programmed to remind the user to begin a prayer or meditation, at a particular time of day, using, for example, light, sound, or vibration.

As another example of an enhanced prayer or meditation experience, pre-packaged prayer/meditation software may be purchased by one or more users, as downloaded software or as a physical module containing such software. The software may be downloaded via mobile computer 220a from the Internet using a prayer or meditation app. Alternately, the software may be shared via a social network or provided from another mobile computer 220b. This way recommend prayers may be shared from a family member, friend, parent, child, etc.

Bracelet/band 100 may include hardware 112 for connecting to a physical module, computer, or other networked device that enables the storage of software in the bracelet/band memory and the implementation of the software by the bracelet/band processor. The software could include, as examples, bible studies or self-improvement meditations by socially popular religious leaders or psychologists. The software may define what each button is dedicated to and the frequency it should be dwelled upon. A record may be kept by the software and provide related analytics to the frequency, dates, time, length, collaboration, etc. of a meditation or prayer. The software may synchronize with other software or applications on the Internet, mobile computer 220a, and/or mobile computer 220b.

Figure 1B:
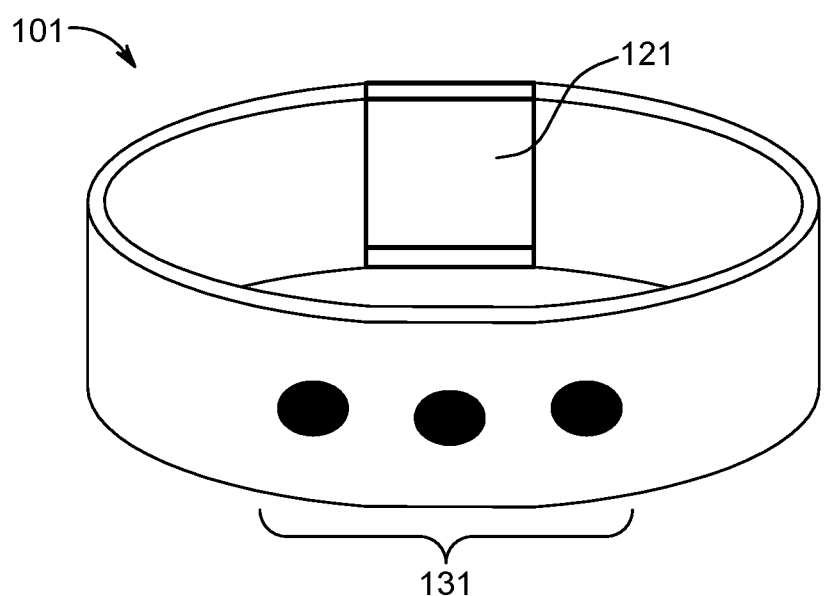
FIG. 1B shows another embodiment of a bracelet/band.

FIG. 1B shows another embodiment of a bracelet/band 101. Clasp/fastener 121 may be used to house a power source, battery, vibrating mechanisms, or the like. A sequence of substantially linear beads 131 may be configured on bracelet/band 101. Beads 131 may be configured as physical or virtual beads shown on a digital display, as explained in other paragraphs herein. Beads 131 may be configured using light emitting diodes (LEDs). Beads 131 may be touch sensitive and be adaptively assigned to complete different prayers or meditations.

Figure 2:
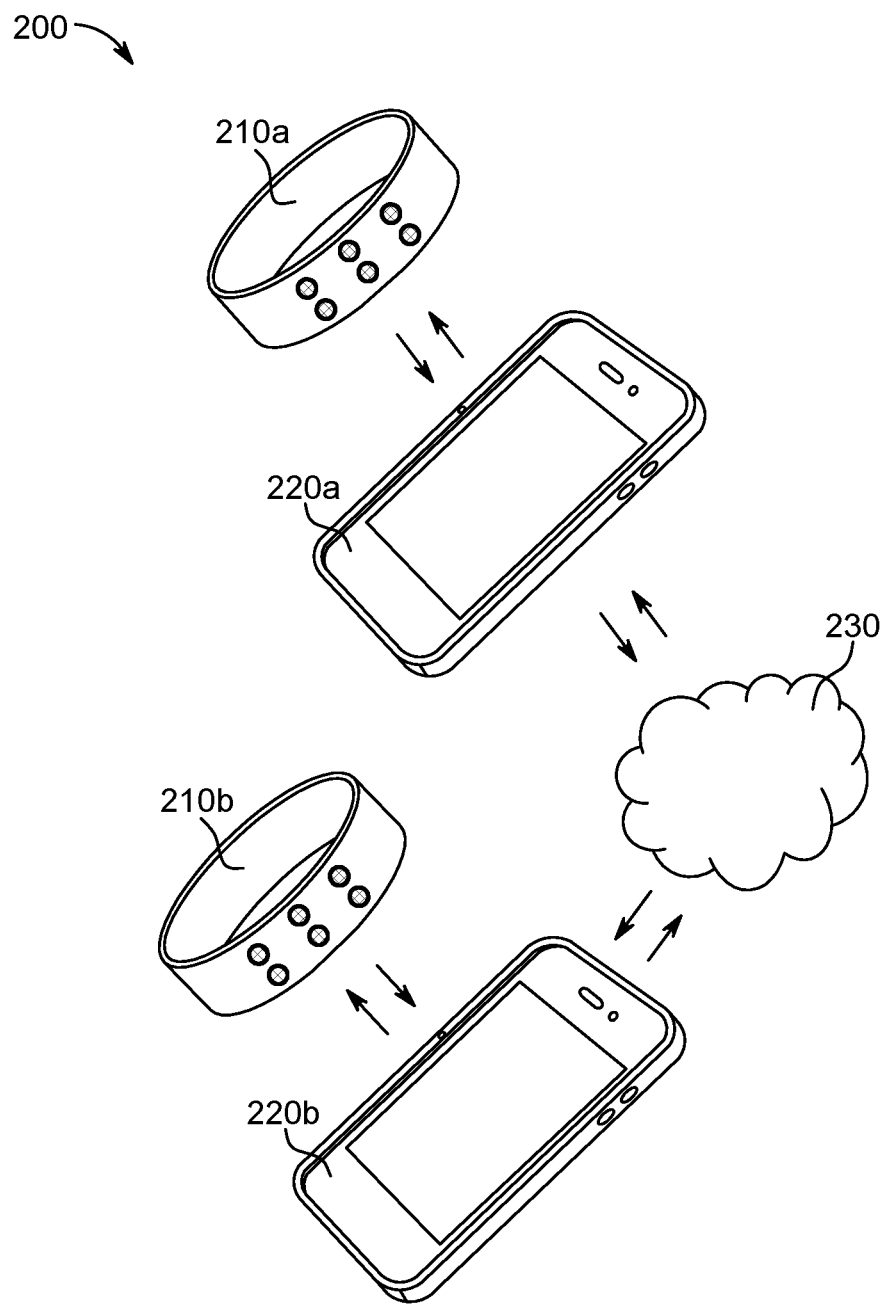
FIG. 2 shows an embodiment of a system for wireless communication between two bracelets/bands.

Bracelet/band 100 may be configured to communicate with one or more other similar bracelets/bands worn by other users. FIG. 2 shows an example of a system 200 for achieving this configuration. Two bracelets/bands 210a and 210b, worn by two individual users separated by a distance, may communicate with each other in both directions through a wireless network 230. Bracelets/bands 210a and 210b may communicate directly with one another through network 230 using wireless communication electronics incorporated within each bracelet/band 210a, 210b. Bracelets/bands 210a and 210b may also communicate directly with one another through BLUETOOTH® using wireless communication electronics incorporated within each bracelet/band 210a, 210b. Alternatively, bracelets/bands 210a and 210b may communicate with each other via one or more portable communication devices, such as a cell phone, smartphone, tablet, conveyance, or any other mobile computer.

In the particular example shown in FIG. 2, bracelet/band 210a transmits information wirelessly to mobile computer 220a, such as a mobile phone. Mobile computer 220a then transmits this information through network 230 to a second mobile computer 220b. Mobile computer 220b then transmits the information to second bracelet/band 210b. Wireless links between the bracelet/band 210a, 210b and the respective mobile computers 220a and 220b may be implemented using a short range wireless communication protocol such as BLUETOOTH®. Wireless links between mobile computers 220a and 220b via network 230 may be implemented using wireless communications standard such as long term evolution (LTE), cdma2000, Universal Mobile Telecommunications System (UMTS), 802.11x, Wi-Fi, or any other wireless networking technology.

Using two-way signal communication and exchange of information between bracelet/bands, as one example, a particular button on one user's bracelet/band 210a may be assigned or customized to be wirelessly connected through wireless network 230 to a particular button on another bracelet/band 210b worn by another user. Operation between the two bracelets/bands may include a mobile application or app on mobile computers 220a and 220b. Operation between the two bracelets/bands may also include a server accessed via a wireless and/or wired network that may coordinate sharing of information related to a performed meditation or prayer.

Mobile computers 220a and 220b with the mobile apps may be configured to tie prayers or meditation completed to social network/media posts such as on Facebook, Google+, Instagram, or the like. When a linked user dwells on the assigned button the other linked user's assigned button will be activated, such as to become illuminated, to vibrate, or to emit a sound. In this way, users can essentially exchange discreet "thinking of you" messages.

Mobile computer 220a may also communicate wirelessly through a group for coordinated prayer or meditation. For instance, a group may be set for a family to pray/meditate together. Another group may be assembled for friends. A priest or coordinator may direct a given group. For each group, bracelet/band 210a or mobile computer 220a may be configured to only share certain information. Thus different privacy levels may be configured.

As another example, mobile computers 220a and 220b may be configured with bracelets/bands 210a and 210b to network in order to quantify the "power of prayer." For instance, a mobile application on mobile computers 220a or 220b many indicate people that are praying for a particular shared prayer request from a user. Additionally, when a user has a particular prayer request answered to their satisfaction, mobile computers 220a or 220b may be configured with bracelets/bands 210a or 210b to send out a "prayer answered" notification to everyone connected to that prayer.

As another example, users can create and join groups of other users who have similar interests or want to meditate or pray together on specific things. The group can define each meditation or prayer and decide how to link particular buttons on their respective bracelet/bands. Groups can share their data to hold themselves and each other accountable to spend time in their prayers and/or meditations.

As another example, a user may request "followers" (people in their network) to pray or meditate for the user. The user can allow their request to be forwarded by their followers to users outside of their personal network 230. When prayer requests are made, the receiving person can accept the request and assign the request to a button, keep track of how many people are connected to the request, or decline the request with or without additional response.

As the number of followers grows, the requester's bracelet/band may provide and receive feedback, such as by illumination, vibration, or a number displayed on a screen, showing the requester the number of followers they have and how that number is changing with time. This feedback may also be displayed to the requester on a portable communication device such as mobile computer 220a or 220b. The feedback may also be shown on a website associated with the bracelet/band 100. A user may choose an allowable level of sharing in all of these examples. When the requester feels their prayer has been answered, or their need met, they can send out a notification to everyone attached to the original request. The notification can be, as examples, in the form of a message displayed on a screen, an illumination of, or a vibration of, the assigned button on each follower's bracelet/band. Thus, in this manner the power of prayer/meditation/affirmation may be quantified.

Figure 3:
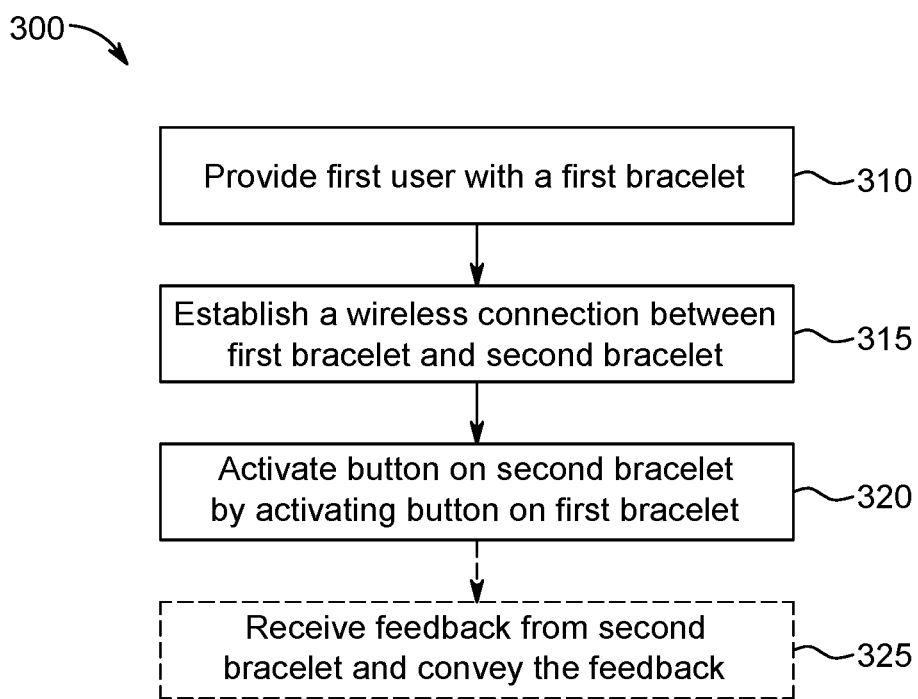
FIG. 3 shows an example of a method of enhancing an experience of prayer or meditation.

FIG. 3 shows a flow chart of a general method 300 of enhancing an experience of prayer or meditation. A user may be provided with a first bracelet/band of a type described hereinbefore (310). A wireless connection between a particular button on the first bracelet/band and a particular button on a second bracelet/band may be established (315). The button on the second bracelet/band may be activated using a button on the first bracelet/band (320). This remote activation is made possible through the wireless connection.

Optionally, feedback may be received from the second bracelet/band and conveyed to a first bracelet/band 325. As an example, the first bracelet/band may establish connections with two or more other bracelets/bands. Such communicating may be for a group of users with similar religious or any other preferences, group prayer/meditation, social networking, or the like.

Although the features and elements of the present invention are described in the example embodiments in particular combinations, each feature may be used alone without the other features and elements of the example embodiments or in various combinations with or without other features and elements of the present invention. Changes in the form and the proportion of parts as well as in the substitution of equivalents are contemplated as circumstances may suggest or render expedient without departing from the spirit or scope of the following claims.

What is claimed is:

1. A system comprising:
   a first band configured with:
      virtual inputs associated with a touch sensor, and touches on a subset of the virtual inputs involves an interactive activity with a second band; and
      wireless communication circuitry that communicate first data to a first mobile device, the first data including information that identifies completion of the interactive activity and indicates a time that the subset are touched;
   wherein the first band instructs the first mobile device to communicate second data to a second mobile device to replicate conduct the interactive activity.

2. The system of claim 1 further comprising:
   the first band configured with circuitry to generate one of a sound, a vibration, feedback, and a tactile sensation in relation to the virtual inputs.

3. The system of claim 1, wherein the subset illuminates as a reminder for the interactive activity and the touches of the subset are performed in a sequence to complete the interactive activity.

4. The system of claim 1, wherein the interactive activity is a group activity to complete with a group of bands.

5. The system of claim 1 further comprising:
   circuitry configured to display virtual buttons on a touchscreen of the first band representing the virtual inputs, wherein the virtual buttons are virtual beads.

6. The system of claim 1 further comprising:
   the first band configured with a vibration mechanism that generates a tactile vibration, wherein the vibration mechanism activates according to an action of a user or by a control signal.

7. The system of claim 1, further comprising:
   the first band configured with a motion sensor that detects a physical input associated with the interactive activity.

8. The system of claim 1, wherein the time indicates a period for dwelling on the virtual inputs before a registered touch on the subset.

9. The system of claim 1, wherein different characteristics on the virtual inputs are associated with rules for a prayer or a meditation.

10. A method comprising:
    touching a subset of virtual inputs, associated with a touch sensor of a first band, relating to an interactive activity with a second band; and
    communicating, by the first band, first data to a first mobile device, the first data including information that identifies completion of the interactive activity and indicates a time that the subset are touched;
    wherein the first band instructs the first mobile device to communicate second data to a second mobile device to conduct the interactive activity.

11. The method of claim 10 further comprising:
    generating, by the first band, one of a sound, a vibration, feedback, and a tactile sensation in relation to the virtual inputs.

12. The method of claim 10, wherein the subset illuminates as a reminder for the interactive activity and the touching of the subset is performed in a sequence to complete the interactive activity.

13. The method of claim 10, wherein the interactive activity is a group activity to complete with a group of bands.

14. The method of claim 10 further comprising:
    displaying, by the first band, virtual buttons on a touchscreen representing the virtual inputs and the virtual buttons are virtual beads.

15. The method of claim 10 further comprising:
    generating, by a vibration mechanism of the first band, a tactile vibration, wherein the vibration mechanism activates according to an action of a user or by a control signal.

16. The method of claim 10 further comprising:
    detecting, by a motion sensor of the first band, a physical input associated with the interactive activity.

17. The method of claim 10, wherein the time indicates a period for dwelling on the virtual inputs before a registered touch on the subset.

18. The method of claim 10, wherein different characteristics on the virtual inputs are associated with rules for a prayer or a meditation.

19. An activity system, comprising:
    a memory communicably coupled to a processor and storing:
    an activity module including instructions that when executed by the processor cause the processor to:
       receive virtual inputs through a touch sensor associated with a first band, wherein touches on a subset of the virtual inputs relate to an interactive activity with a second band; and
       communicate, by the first band, first data to a first mobile device, the first data including information that identifies completion of the interactive activity and indicates a time that the subset are touched;
       wherein the first mobile device communicates second data to a second mobile device to conduct the interactive activity.

20. The activity system of claim 19, wherein the subset illuminates as a reminder for the interactive activity and the touches of the subset are performed in a sequence to complete the interactive activity.

* * * * *